United States Patent [19]

Washizu

[11] Patent Number: 5,163,719
[45] Date of Patent: Nov. 17, 1992

[54] CONNECTOR FOR CONNECTING SLENDER PIPING MEMBERS

[75] Inventor: Katsushi Washizu, Numazu, Japan

[73] Assignee: Usui Kokusai Sangyo Kaisha Limited, Japan

[21] Appl. No.: 640,911

[22] Filed: Jan. 3, 1991

[30] Foreign Application Priority Data

Jan. 10, 1990 [JP] Japan ............................ 2-976

[51] Int. Cl.⁵ ............................................ F16L 37/12
[52] U.S. Cl. .................................... 285/319; 285/921
[58] Field of Search .................. 285/319, 921, 39, 348

[56] References Cited

U.S. PATENT DOCUMENTS

| | | |
|---|---|---|
| 2,892,991 | 6/1959 | Beebee et al. . |
| 3,169,030 | 2/1965 | Lippincott . |
| 3,453,005 | 7/1969 | Foults . |
| 3,826,523 | 7/1974 | Eschbaugh . |
| 3,933,378 | 1/1976 | Sandford et al. . |
| 4,026,581 | 5/1977 | Pasbrig . |
| 4,035,005 | 7/1977 | DeVincent et al. . |
| 4,074,912 | 2/1978 | Van Bilderbeek et al. . |
| 4,219,222 | 8/1980 | Brusadin . |
| 4,275,907 | 6/1981 | Hunt . |
| 4,451,069 | 5/1984 | Melone . |
| 4,601,497 | 7/1986 | Bartholomew . |
| 4,637,636 | 1/1987 | Guest . |
| 4,637,640 | 1/1987 | Fournier et al. . |
| 4,673,199 | 6/1987 | Renfrew . |
| 4,681,351 | 7/1987 | Bartholomew . |
| 4,730,856 | 3/1988 | Washizu . |
| 4,749,214 | 6/1988 | Hoskins et al. . |
| 4,753,458 | 6/1988 | Case et al. . |
| 4,776,616 | 10/1988 | Umehara et al. . |
| 4,778,203 | 10/1988 | Bartholomew . |
| 4,781,400 | 11/1988 | Cunningham . |
| 4,793,637 | 12/1988 | Laipply et al. . |
| 4,895,396 | 1/1990 | Washizu . |
| 4,913,467 | 4/1990 | Washizu . |
| 4,915,420 | 4/1990 | Washizu . |
| 4,925,217 | 5/1990 | Ketcham ............................ 285/319 |
| 4,944,537 | 7/1990 | Usui et al. . |
| 4,946,205 | 8/1990 | Washizu . |
| 4,948,180 | 8/1990 | Usui et al. . |
| 4,964,658 | 10/1990 | Usui et al. . |
| 4,997,216 | 3/1991 | Washizu . |

FOREIGN PATENT DOCUMENTS 593413 5/1959 Italy .
855603 12/1960 United Kingdom .

*Primary Examiner*—Eric K. Nicholson

[57] ABSTRACT

Herein disclosed is a connector for connecting slender piping members. The connector comprises a connector body and a separate socket body. The connector body is formed axially therethrough with a smaller-diameter chamber leading to a communication hole in a connecting cylindrical wall at the leading end and a stepped larger-diameter chamber at the back of the smaller-diameter chamber. The larger-diameter chamber has its cylindrical rear circumference formed into an inwardly inclined retaining wall. The connector body has seal ring members fitted in the smaller-diameter chamber and a bushing member fitted at the back of the seal ring members. The socket body has generally L-shaped elastic pawl walls projecting integrally from the retaining wall in the larger-diameter chamber and opposed in the inserting direction to an annular wall at the rear end. The socket body has its slope retained in the vicinity of the root of the L-shaped bent portion. An annular ridged wall formed in the vicinity of the connecting end portion of a piping member fitted in the larger-diameter chamber is elastically retained under the pipe connected state by the leading ends of the pawl walls.

10 Claims, 1 Drawing Sheet

PRIOR ART

CONNECTOR FOR CONNECTING SLENDER PIPING MEMBERS

BACKGROUND OF THE INVENTION

1. Field of the Invention:

The present invention relates generally to an improvement in the structure of a connector for connecting slender piping members such as metal pipes or resin tubes (as will be shortly referred to as the "piping members"), which are so slender as to have a diameter of about 20 mm or less and are used to supply oil or air to various machines or apparatus such as automobiles.

2. Description of the Prior Art

The connector of this kind according to the prior art will be reviewed in the following with reference to FIG. 4. A connector body 11 is formed axially therethrough with a larger-diameter hole 13 which has a retaining wall 11' at the rear circumferential end of a cylindrical wall leading to the communication hole 14 of a connecting cylindrical wall at the leading end. The connector body 11 has seal ring members 16 and a bushing member 17 mounted therein. A socket body 18 is formed with pawl walls 15 which are inclined forward in the opposed positions at the leading end side. The socket body 18 has its rear end annular stepped circumference 18' retained on the aforementioned retaining wall 11' of the connector body 11.

The pawl walls 15 are positioned in engagement openings or slots which are formed in the cylindrical wall defining the aforementioned larger-diameter chamber 13 of the connector body 11. In this state, a piping member (P₀) is connected by having its annular ridged wall P₀' assembled in the larger-diameter chamber 13 and elastically retained by the leading ends of the aforementioned pawl walls 15.

In the prior art, however, the socket body 18 has its stepped circumference 18' retained by the retaining wall 11' of the connector body 11 and has its pawl walls 15 positioned for assembly in the engagement openings 19 of the cylindrical wall of the connector body 11. Thus, when the socket body 18 is to be inserted, the circumferential wall of their root portion 18" of the pawl walls 15 has to be depressed, before it passes inside of the retaining wall 11', and has to be pushed from the back of the larger-diameter chamber 13. As a result, the socket body itself has to have a large diameter, and the retention at the retaining wall 11' of the cylindrical wall enlarges the overall size of the product. Thus, a difficulty is invited for the arrangement in a narrow place. Since, moreover, the large diameter invites an elongation of the pawl walls 15 to weaken the elastic retention of the ridged wall P₀' of the piping member P₀. As a result, the retention yields to induce leakage in the arrangement under vibrations. Thus, the connection has a problem of instability.

SUMMARY OF THE INVENTION

The present invention has been conceived in view of the above-specified problems concomitant with the prior art and has an object to provide a connector for connecting slender piping members, which is enabled to make an arrangement in a narrow place by reducing the diameter of the socket body itself and by making the product compact in its entirety including the connector body, and which is enabled to exhibit the retention more effectively to ensure the connection for a long time by shortening the structure of the pawl walls and by supporting the force against the extraction of the piping member by retaining portion of the generally L-shaped slopes and the retaining wall.

According to the present invention, there is provided a connector for connecting slender piping members, which connector comprises: a connector body formed axially therethrough with a smaller-diameter chamber leading to a communication hole in a connecting cylindrical wall at the leading end and a stepped larger-diameter chamber at the back of said smaller-diameter chamber, said larger-diameter chamber having its cylindrical rear circumference formed into an inwardly inclined retaining wall, said connector body having seal ring members fitted in said smaller-diameter chamber and a bushing member fitted at the back of said seal ring members; and a separate socket body having generally L-shaped elastic pawl walls projecting integrally from said retaining wall in said larger-diameter chamber and opposed in the inserting direction to an annular wall at the rear end, said socket body having its slope retained in the vicinity of the root of said L-shaped bent portion, wherein an annular ridged wall formed in the vicinity of the connecting end portion of a piping member fitted in said larger-diameter chamber is elastically retained under the pipe connected state by the leading ends of said pawl walls.

Moreover, said connector body is made of a resin or metal. Still moreover, said socket body is made of a metallic spring or a resin.

With the structure thus made according to the present invention, the aforementioned socket is inserted in advance into the larger-diameter chamber of the connector body such that the slope of the L-shaped bent portion of the socket body is retained on the retaining wall formed of the rear circumferential end of the cylinder of the connector body. Thanks to this structure, it is possible to fit the piping member very easily and to reduce the diameter of the socket body. As a result, the product can be made compact in its entirety including the connector body so that it can be arranged in a narrow place. Thanks to the shortened pawl walls and the retaining structure for supporting the force against the extraction of the piping member by the slope, moreover, the retaining force can be exhibited more effectively to maintain the connection reliably.

DETAILED DESCRIPTION OF THE PREFERRED EMBODIMENTS

Figure 1:
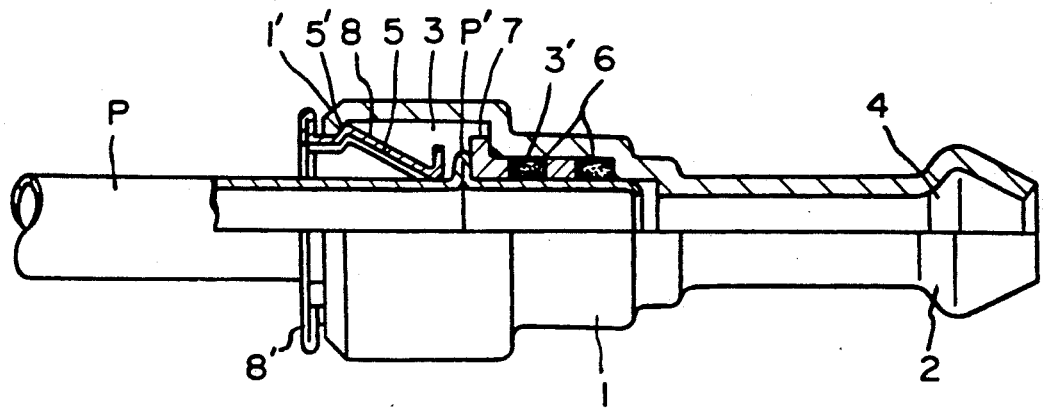
FIG. 1 is a partially cut-away longitudinal section showing the connected state of the connector for connecting slender piping members according to one embodiment of the present invention.
Figure 2:
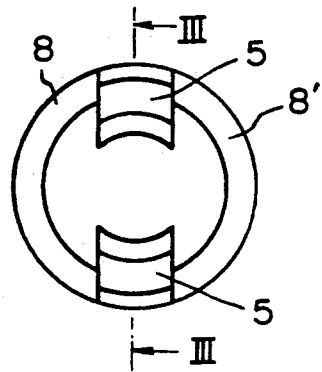
FIG. 2 is a front elevation showing the socket body of FIG. 1 by itself.
Figure 3:
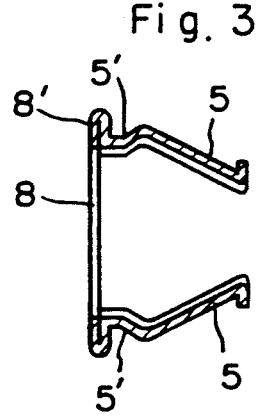
FIG. 3 is a section taken along line III—III of FIG. 2.
Figure 4:
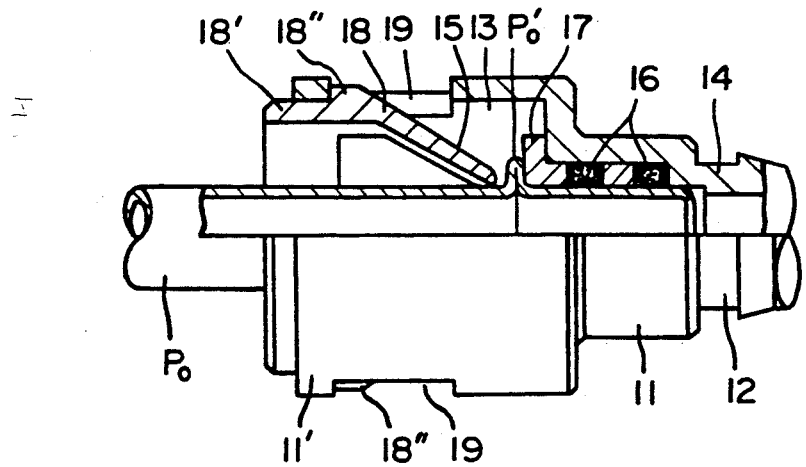
FIG. 4 is a partially cut-away longitudinal section showing the connected state of the connector of the prior art.

In FIGS. 1 to 3, reference numeral 1 designates a connector body which is made of a metal or resin. This connector body 1 is formed axially therethrough with a smaller-diameter chamber 3', which is expanded to lead to a communication hole 4 of a connecting cylindrical wall 2 and to connect a resin tube or rubber hose (although not shown) at its leading end, and a stepped larger-diameter chamber 3 which is positioned at the back of the smaller-diameter chamber 3'. The rear circumferential end of the cylinder of said larger-diameter chamber is inwardly inclined to form a retaining wall 1'. In the smaller-diameter chamber 3', there are fitted seal ring members 6 of an elastic material such as rubber, which are disposed through a spacer, as desired, and a bushing member 7 which is disposed at the back of the seal ring members 6. Numeral 8 designates a separate socket body which is made of a metallic spring or a resin. The socket body 8 is formed at its rear end annular wall 8' with generally L-shaped elastic pawl walls 5 which are opposed to the inserting direction. Thus, a piping member P is connected by retaining a slope 5', which is formed in the vicinity of the generally L-shaped bent root of the elastic pawls 5 of said socket body, on the retaining wall 1' of the aforementioned connector body 1 in the larger-diameter chamber 3, and by elastically retaining an annular ridged wall P', which is formed in the vicinity of the connecting end portion of the piping member P, on the leading ends of the elastic pawl walls 5.

As has been described hereinbefore, the connector for connecting the slender piping members according to the present invention is constructed such that the socket body 8 having the generally L-shaped elastic pawl walls 5 opposed to the annular wall 8' at the rear end is retained at its bent slope 5' in the vicinity of the bent root by the aforementioned retaining wall 1'. As a result, it is possible to fit the piping member P very easily. At the same time, the socket body 8 is made slender to make the product compact in its entirety including the connector body 1 so that the arrangement can be accomplished in a narrow place. Thanks to the shortened pawl walls 5 and the structure in which the force against the extraction of the piping member P is retained through the pawl walls 5 at the retention between the generally L-shaped slope 5' and the retaining wall 1', moreover, the retaining force of the piping member P at the ridged wall P' can be exhibited further effectively to maintain the connection reliably for a long time. Thus, the connector for connecting the slender piping members according to the present invention is remarkably useful.

I claim:

1. A connector for connecting a slender piping member, said piping member having an end and an annular ridged wall spaced from the end, said connector comprising:

a connector body having opposed leading and rear ends, a communication bore extending rearwardly from the leading end, a small-diameter chamber intermediate the leading and rear ends of the connector body and communicating with the communication bore, a generally cylindrical wall defining a large-diameter chamber extending into the rear end of the connector body and communicating with the small-diameter chamber, a retaining wall extending inwardly from the generally cylindrical wall at the rear end of the connector body and having an inner circumference defining a small-diameter entry to the large-diameter chamber;

seal ring members fitted in the small-diameter chamber for sealing engagement with portions of the slender piping member intermediate the annular ridged wall and the end of the piping member;

a bushing member fitted in the connector body rearwardly of the seal ring members; and a socket body comprising a generally planar annular wall disposed external of the connector body adjacent the rear end thereof and a plurality of pawl wall members extending unitarily from the annular wall, each said pawl wall member including a root adjacent the annular wall, the root having a portion engaging the inner circumference of the retaining wall of the connector body, a sloping wall extending outwardly from the root and engaging the retaining wall in the large-diameter chamber of the connector body, and an inwardly inclined wall extending from the sloping wall and into engagement with the ridged wall of the piping member, whereby the sloping walls of the socket body retain the socket body in the connector body, and whereby the inwardly inclined walls engage the annular ridged wall of the piping member to retain the piping member in the connector body.

2. A connector according to claim 1 wherein the root of each said pawl wall member is generally L-shaped, said root including a radially aligned portion disposed in generally face-to-face relationship with the annular wall of the socket body and adjacent the rear end of the connector body and a generally axially aligned portion extending through the inner circumference of the retaining wall of the connector body.

3. A connector according to claim 2 wherein the axially aligned portion of each L-shaped root of each pawl wall member defines an axial length such that the retaining wall of the socket body is securely engaged between the radially aligned portion of the root and the outwardly sloping wall of the associated pawl wall member.

4. A connector according to claim 2 wherein the annular wall of the socket body and the cylindrical wall of the connector body each define outer diameters, the outer diameter of the annular wall of the socket body being smaller than the outer diameter of the cylindrical wall of the connector body.

5. A connector according to claim 2 wherein the radially aligned portion of each said L-shaped root is securely disposed in face-to-face contact with both the annular wall of the socket body and the retaining wall of the connector body.

6. A connector according to claim 1 wherein the connector body is made of metal.

7. A connector according to claim 1 wherein said socket body is made of resin.

8. A connector for connecting a slender piping member, said piping member having an end and an annular ridged wall spaced from the end, said connector comprising:

a connector body having opposed leading and rear ends, a communication bore extending rearwardly from the leading end, a small-diameter chamber intermediate the leading and rear ends of the connector body and communicating with the communication bore, a generally cylindrical wall having an outer circumference and an opposed inner circumference defining a large-diameter chamber extending into the rear end of the connector body and communicating with the small-diameter chamber, a retaining wall extending inwardly from the generally cylindrical wall at the rear end of the connector body and having an inner circumference defining a small-diameter entry to the large-diameter chamber;

seal ring members fitted in the small-diameter chamber for sealing engagement with portions of the slender piping member intermediate the annular ridged wall and the end of the piping member;

a bushing member fitted in the connector body rearwardly of the seal ring members; and a metallic socket body comprising a generally planar annular wall radially aligned and disposed external of the connector body adjacent the rear end thereof, said annular wall defining an outer circumference smaller than the outer circumference of the cylindrical wall of the connector body, and a plurality of pawl wall members extending unitarily from the annular wall, each said pawl wall member including an L-shaped root having a first leg extending radially inwardly from the outer circumference of the annular wall and a second leg extending axially forwardly from the first leg and engaging the inner circumference of the retaining wall of the connector body, a sloping wall extending outwardly from the second leg of the root and engaging the retaining wall in the large-diameter chamber of the connector body, and an inwardly inclined wall extending from the sloping wall and into engagement with the ridged wall of the piping member, whereby the sloping walls of the socket body retain the socket body in the connector body, and whereby the inwardly inclined walls engage the annular ridged wall of the piping member to retain the piping member in the connector body.

9. A connector according to claim 1, wherein said connector body is made of a resin.

10. A connector according to claim 1, wherein said socket body is made of a metallic spring.

* * * * *